(12) United States Patent
da Silva et al.

(10) Patent No.: US 12,408,579 B2
(45) Date of Patent: Sep. 9, 2025

(54) ADJUSTMENT SYSTEM FOR MOUNTING AND FIXING SUPPORTS ON TOOL BARS OF AGRICULTURAL IMPLEMENTS AND AGRICULTURAL IMPLEMENT

(71) Applicant: CNH Industrial America LLC, New Holland, PA (US)

(72) Inventors: Regis Carlos Pereira da Silva, Dobrada (BR); Felipe Brum da Silva, Piracicaba (BR); Eduardo Copetti, Piracicaba (BR); Leonardo Reis Menezes, Piracicaba (BR); Ricardo Diniz Alves, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 638 days.

(21) Appl. No.: 17/875,592

(22) Filed: Jul. 28, 2022

(65) Prior Publication Data
US 2023/0036782 A1  Feb. 2, 2023

(30) Foreign Application Priority Data
Jul. 31, 2021 (BR) .......................... 1020210151854

(51) Int. Cl.
*A01C 7/20* (2006.01)
(52) U.S. Cl.
CPC .................... *A01C 7/201* (2013.01)
(58) Field of Classification Search
CPC ....... A01C 7/201; A01C 7/208; A01B 33/087; A01B 35/22; A01B 35/28; A01B 63/00; A01B 19/02; A01B 39/22
USPC .................................................. 172/762, 763
See application file for complete search history.

(56) References Cited

U.S. PATENT DOCUMENTS

| | | | | |
|---|---|---|---|---|
| 4,271,913 A | * | 6/1981 | Wheeler | A01B 3/26 172/741 |
| 9,743,576 B2 | * | 8/2017 | Gadzella | A01B 15/14 |
| 10,334,774 B2 | | 7/2019 | Gadzella et al. | |
| 10,561,057 B2 | * | 2/2020 | Gadzella | A01B 15/14 |

(Continued)

FOREIGN PATENT DOCUMENTS

| | | | | |
|---|---|---|---|---|
| DE | 102016106353 A1 | * | 10/2017 | .......... A01B 63/245 |
| EP | 3228170 A1 | * | 10/2017 | .......... A01B 63/245 |
| EP | 3944746 A1 | * | 2/2022 | .......... A01B 63/245 |

*Primary Examiner* — Jamie L McGowan
(74) *Attorney, Agent, or Firm* — Fletcher Yoder, P.C.

(57) ABSTRACT

An adjustment system for mounting and fixing a support on a toolbar of an agricultural implement includes an upper mounting assembly having an upper support block. The upper support block is configured to couple to the support via first fasteners, and the upper support block is configured to engage an upper mounting guide of the toolbar. The adjustment system also includes a lower mounting assembly having a lower support block. The lower support block is configured to couple to the support via second fasteners, and the lower support block is configured to engage a lower mounting guide of the toolbar. Furthermore, the adjustment system includes one or more eccentric bushings, and each eccentric bushing has a passing hole displaced from a center of the eccentric bushing. At least one support block has at least one opening, and a respective eccentric bushing is disposed within each opening.

11 Claims, 5 Drawing Sheets

(56) References Cited

U.S. PATENT DOCUMENTS

| | | | |
|---|---|---|---|
| 2003/0205392 A1* | 11/2003 | Ruckle | F16C 11/02 |
| | | | 172/705 |
| 2015/0245557 A1* | 9/2015 | Bruer | A01C 7/081 |
| | | | 111/52 |
| 2017/0000004 A1* | 1/2017 | Gadzella | A01C 7/201 |
| 2017/0055438 A1* | 3/2017 | Bruer | A01C 7/208 |
| 2022/0030762 A1* | 2/2022 | Maro | A01C 7/163 |

* cited by examiner

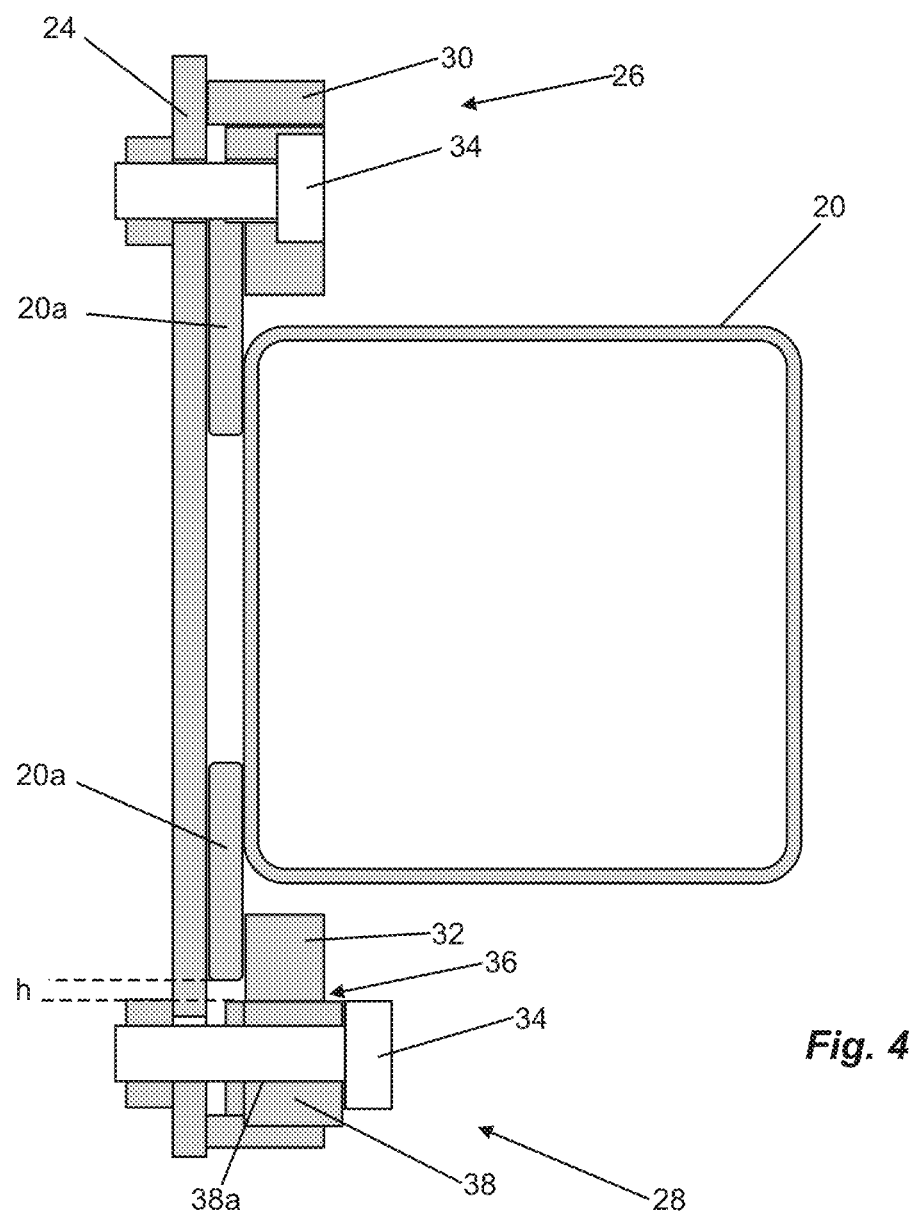
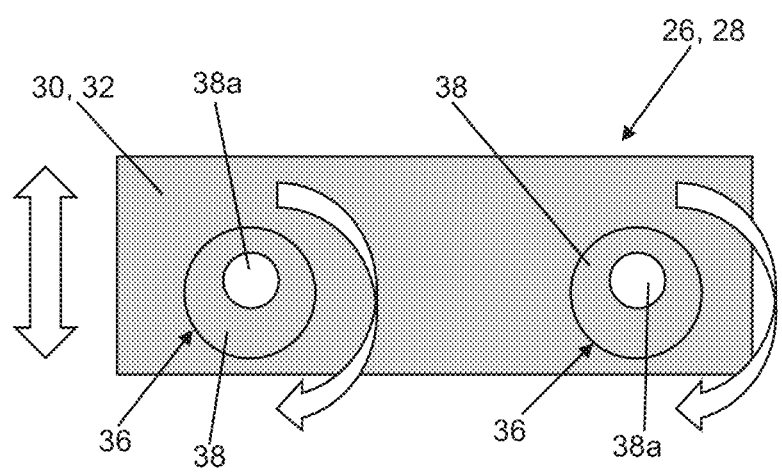
Fig. 4
Fig. 5

ADJUSTMENT SYSTEM FOR MOUNTING AND FIXING SUPPORTS ON TOOL BARS OF AGRICULTURAL IMPLEMENTS AND AGRICULTURAL IMPLEMENT

CROSS-REFERENCE TO RELATED APPLICATION

This application claims priority from and the benefit of BR application Ser. No. 1020210151854, entitled "ADJUSTMENT SYSTEM FOR MOUNTING AND FIXING SUPPORTS ON TOOL BARS OF AGRICULTURAL IMPLEMENTS AND AGRICULTURAL IMPLEMENT", filed Jul. 31, 2021, which is hereby incorporated by reference in its entirety.

FIELD OF INVENTION

The present invention relates, in general, to a new adjustment system for mounting and fixing supports on toolbars of agricultural implements, such as planters and seeders. More particularly, this adjustment system comprises technical, constructive and functional features designed and developed to eliminate gaps realized during the assembly and fixation of the supports of the planting row units on the toolbar of the agricultural implements. Also, the present invention deals with a new agricultural implement that has this adjustment system for mounting and fixing the supports of the planting row units on the toolbar.

BACKGROUND OF THE INVENTION

Several models of agricultural implements are known in the state of the art, for example planters and seeders that are used for the distribution of seeds, fertilizers, herbicides, pesticides and fungicides on the planting rows in the field. As must be appreciated by a person skilled in the art, these models of agricultural implements can be self-propelled or not, and in the latter case, they are towed by a work vehicle, for example, a tractor.

Usually, these implements have a rigid structural chassis that is mounted on wheels installed at strategic points to allow their displacement, and this structural chassis also supports, a plurality of planting row units which are assembled and installed longitudinally along the entire length of said structural frame, with each planting row unit responsible for cutting the straw, opening a furrow in the ground, applying manure/fertilizers, depositing the seeds at a desired depth, covering the furrow and compacting the ground. Normally, these implements also comprise silos and tanks intended for the storage of seeds, fertilizers, herbicides, pesticides and fungicides, which end up being supported by the aforementioned structural chassis.

As must be appreciated by a person skilled in the art, these planting row units are normally installed on the toolbar through supports that are mounted in a way that they can be moved laterally to allow the definition of the distance between the planting row units and, consequently, the distance of the planting rows in the field, since, for each type of planted crop, a predetermined distance is required.

In this context, it is observed that these supports for the planting row units need to include means that facilitate this spacing and the positioning between the planting row units, because throughout the year, the same agricultural implement can be used to plant and sow different crops and, therefore, the farmer needs to make these adaptations with some frequency. Therefore, for these reasons, there are known technical solutions that try to facilitate this work, for example, in some models the toolbars have rails or guides where it is possible to mount the supports and, somehow, slide them before carrying out the effective locking by means of fasteners.

Despite facilitating the assembly and fixing of the planting row units, there were some inconveniences related to small gaps between the assembly components, especially between the supports and the toolbar that, during use, due to the conditions of the ground that these equipment's circulate, end up causing high levels of trepidation that can interfere in working conditions, in the control of the distribution of seeds and other agricultural products in the field that, in the end, can affect the productivity and efficiency of the process of deposition of materials in the field. Moreover, depending on the level of trepidation, there is a risk that the fasteners will loosen and, with this, jeopardizing the displacement of the planting row units whose results can be disastrous and dangerous, both from the point of view of productivity and safety of the work performed.

As must be appreciated by a person skilled in the art, these small gaps are being formed particularly due to the way these components are manufactured, which there are parts that do not require high precision, being usually cast and welded, which ends up making it difficult to obtain a standardization in the dimensional of the parts and, consequently, generating small variations that can cause the aforementioned gaps when assembling and fixing the parts on the agricultural implement.

Thus, as can be seen, the agricultural implements, of the planter and seeder type, known in the state of the art, lack a practical, functional, and mainly efficient solution, which is capable of eliminating the assembly and fixing gaps of the supports for the planting row units and, with this, eliminate the risk of falling productivity and accidents eventually caused by the vibrations usually caused by the gaps resulting from the manufacture and assembly of the parts. Therefore, these are, among others, the inconveniences, limitations and solutions that it is intended to solve and obtain with the development of the present invention.

DESCRIPTION OF THE INVENTION

Thus, according to the above, the present invention aims to provide a new adjustment system for assembling and fixing supports on agricultural implements tool bars, particularly those intended for the distribution of seeds, manures, herbicides, pesticides and fungicides in the field, such as planters and seeders, and this new adjustment system was designed and developed to obtain a practical, functional and efficient solution to the problems, limitations and inconveniences revealed in the state of the art, as summarized above.

More particularly, it is one of the objectives of the present invention to provide a new adjustment system for mounting and fixing supports on agricultural implements toolbars that comprises technical, constructive and functional features: capable of eliminating possible gaps obtained in the assembly and fixation of the support for planting row units on to the toolbar and, with that, guarantee the positioning and ensure the working conditions in the field of all the planting row units of the agricultural implement.

Also, it is one of the objectives of the present invention to obtain an agricultural implement, such as a planter, seeder, fertilizer spreader or a sprayer, which comprises planting row units installed on the toolbar through supports that are mounted and fixed through said adjustment systems, as mentioned above.

Thus, in order to achieve the technical and functional improvements summarized above, among others, the present invention refers to a new adjustment system for mounting and fixing supports on agricultural implements toolbars, designed to be applied to the mounting guides of the tool bar and it is formed by at least one upper mounting assembly and at least one lower mounting assembly, which comprise upper and lower support blocks that are associated with said support through fasteners, being at the same time at least one of said support blocks comprises at least one opening for accommodating an eccentric bushing whose the passing hole is offset from the center of that bushing.

According to an embodiment of the present invention said support blocks are configured to move vertically.

Still, according to another embodiment of the system, according to the present invention, these support blocks comprise only one opening. Alternatively, these support blocks comprise two or more openings.

Also, according to a further embodiment of the present invention, said eccentric bushings are applied to the lower mounting assembly, the upper mounting assembly, or both mountings assemblies.

In another embodiment of the present invention, said fasteners are of the screw type, or they can also be of the screw and nut assembly type.

According to a possible embodiment of the present invention, the system can be configured to be applied to toolbars with linear type mounting guides, formed in a "C" type setting, or a combination of profiles.

Still, according to another particular embodiment of the system, according to the present invention, said eccentric bushing can comprise a smooth or threaded external diameter.

Additionally, as mentioned above, the present invention also deals with an agricultural implement that comprises a structural chassis supported by at least one assembly of wheels and also has toolbars on which several planting row units are installed through their respective supports, and the supports of this agricultural implement are mounted and fixed next to the toolbar through an adjustment system as mentioned above.

According to possible embodiments of the present invention, this agricultural implement can be, for example, a planter, seeder, fertilizer machine or a sprayer.

BRIEF DESCRIPTION OF DRAWINGS

The features, advantages and functional improvements of the present invention, as indicated above, will be better understood by one skilled in the art from the following detailed description, as an exemplary mode, and not restrictive mode, of possible embodiments, and with reference to the figures attached, which:

FIG. 4 shows a sectional side view of the toolbar segment with the supports shown in FIG. 3;

FIG. 5 shows a front view of the bottom mounting assembly of the adjustment system of the present invention.

DESCRIPTION OF THE EMBODIMENTS OF THE INVENTION

The invention will now be described with reference to its exemplary embodiments, and with reference to the attached figures. Such figures are schematic, and their dimensions and/or proportions may not correspond to reality, since they aim to describe the present invention in a didactic way. Furthermore, certain known and common constructive details may have been omitted for greater clarity and conciseness from the description that follows. Reference numbers used are repeated throughout the figures to identify identical or similar parts. The terms eventually used such as "above", "below", "front", "back", "right", "left" etc., and its variants must be interpreted according to the guidance given in FIG. 1.

Figure 1:
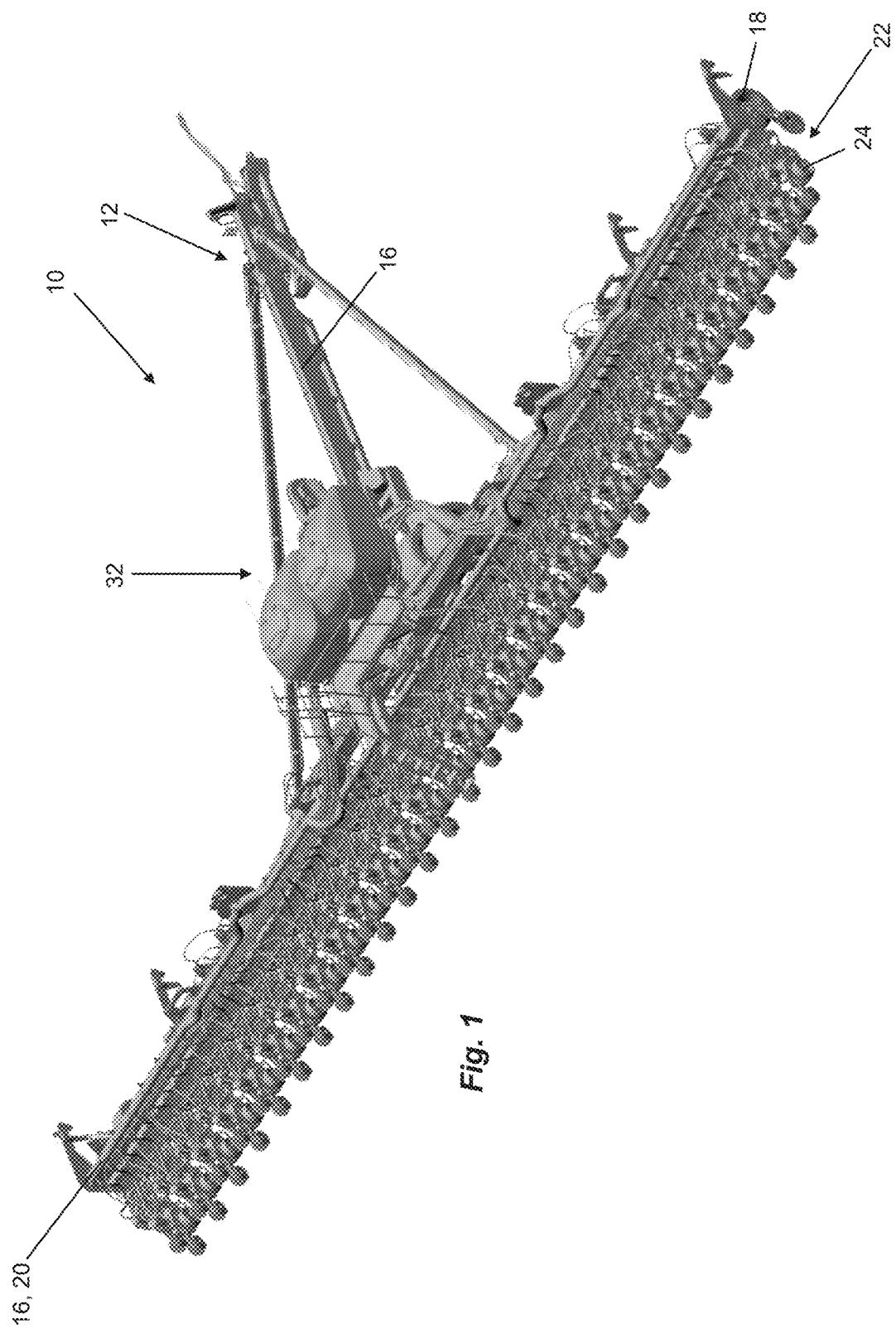
FIG. 1 shows a schematic perspective view of an agricultural implement model, such as a planter or seeder.

Now, with reference to the attached drawings and, more specifically to FIG. 1, an agricultural implement 10 is represented used for the distribution of seeds, manures, fertilizers, herbicides, pesticides and fungicides on the planting row in the field, such as the so-called planters and seeders, which is being configured to be towed across the field by a work vehicle, for example a tractor. As will be appreciated by a person those skilled in the art, these agricultural implement models 10 are formed by a tongue bar 12 designed to, on the one side, couple to the work vehicle, and on the other side, support the structural chassis 16 which is mounted on at least one assembly of wheel 18 and also has toolbars 20 on which several planting row units 22 are installed. Said agricultural implement 10 also comprises silos or tanks 32 intended for the storage of seeds and/or manure/fertilizer and are usually positioned in the central portion of the structural chassis 16.

Figure 2:
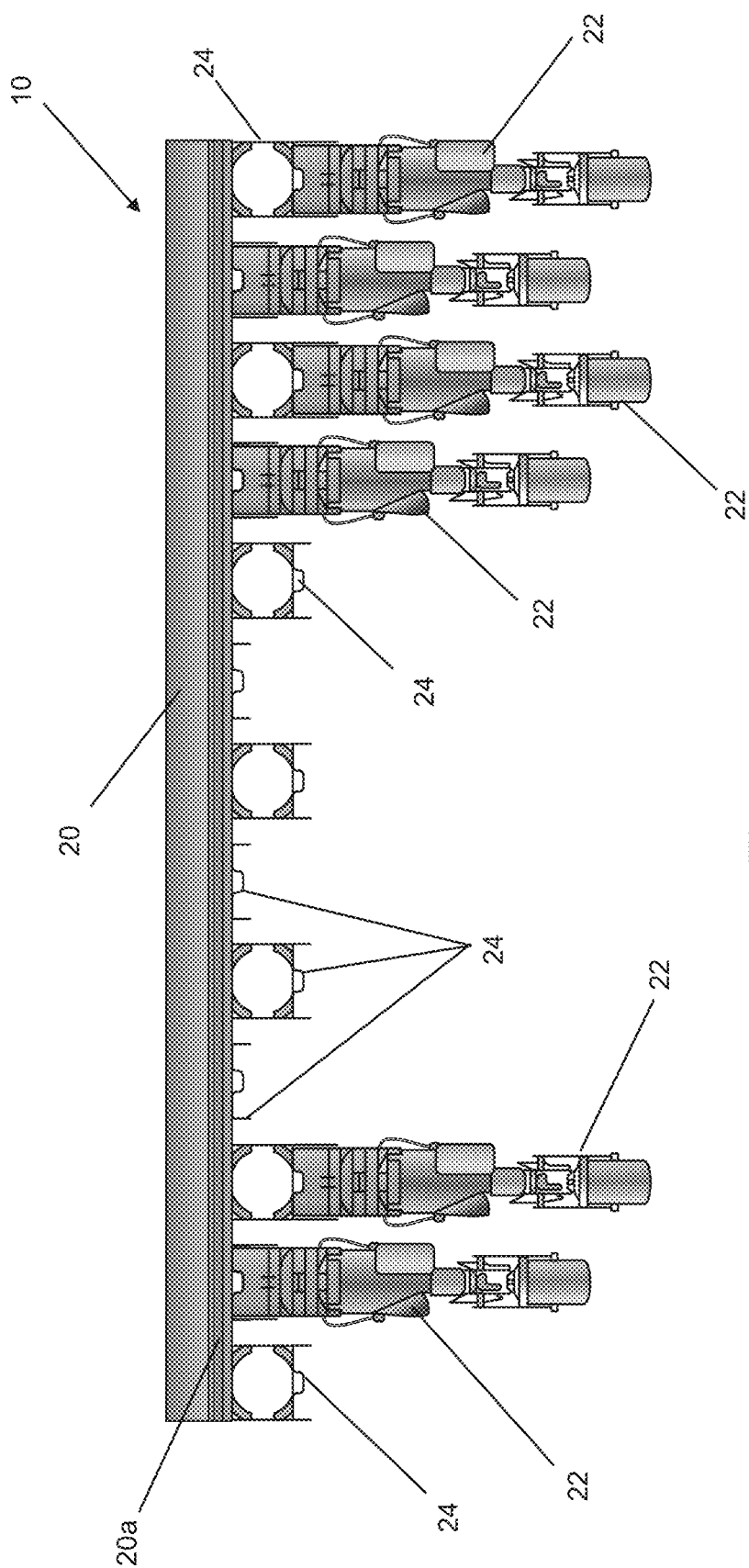
FIG. 2 shows a partial top view of a toolbar with some planting row units mounted on the respective supports.

Each planting row unit 22, as can be seen in FIG. 2, can be installed on the toolbar 20 through supports 24, depending on the desired setting, mainly determined by the type of crop being sown and the spacing between the planting rows that is desired in the field, these supports 24 can comprise different extensions to thereby allow the planting row units 22 to be installed on the toolbar 20 one next to the other, without interference between them.

An agricultural implement 10 as described herein may be, by way of reference, a model of planter produced by CNH Industrial, commercialized under the brands Case IH and New Holland.

The terms referred herein as agricultural implement, planter, seeder and their variants are used interchangeably to designate equipment, or a machine designed and configured to promote the distribution of seeds, manure, fertilizers, herbicides, pesticides and fungicides in the ground.

Thus, in view of the context indicated above, and with reference now to the other attached schematic figures, it appears that the adjustment system for mounting and fixing supports on toolbars 20 of agricultural implements 10, according to the present invention, is designed to be applied together with the mounting guides 20a of the toolbar 20 and configured for the mounting and fixing of the support 24 of each planting row unit 22, said adjustment system being formed by an upper mounting assembly 26 and a lower mounting assembly 28, which comprise upper 30 and lower 32 support blocks that are associated with support 24 through fasteners 34, wherein at least one of said support blocks 30, 32 comprises opening 36 for accommodating an eccentric bushing 38 whose the passing hole 38a is displaced from the center of said bushing 38.

Thus, as can be seen particularly in FIGS. 4 and 5, at the time of installation of the support 24 it is possible that the dimensioning of the parts, for example of the support blocks 30, 32, of the mounting guides 20a of the toolbar 20, causes gaps (h) which, as reported above with respect to the state of the art, can generate significant problems and inconvenience during work operations. Thus, with the adjustment system of the present invention, when the technician tightens the fasteners 34, said eccentric bushings 38 are rotated and, due to the configuration of the passing hole 38a, the support block 30 moves vertically 30, 32 until it touches the mounting guide 20a, eliminating said gap (h) and, on this situation, the fasteners can be effectively locked. As will be appreciated by those skilled in the art, in practice, it is possible for technicians to pre-assemble the system and after that adjust said eccentric bushings 38 in order to eliminate the gaps and, only after this adjustment, technicians can perform tightening and torque control of fasteners 34.

Said support block 30, 32, according to possible embodiments of the present invention, may comprise only one opening 36 and, therefore, each support attachment point is used as one block, but optionally, this support block 30, 32 may comprise two or more openings 36, as shown in the attached figures.

It is worth noting that, although the figures represent the application of the eccentric bushings 38 only in the lower mounting assembly 28, as must be appreciated by those skilled in the art, these eccentric bushings 38 can also be applied only in the upper mounting assembly 26, or in both top 26 and bottom 28 mounting assemblies.

Optionally, according to possible embodiments of the present invention, said eccentric bushing 38 may comprise a smooth or threaded outer diameter and, in the latter case, the inner surface of the openings 36 has a corresponding configuration to interact with that outer diameter.

Regarding the fasteners 34, according to the present invention, they can be nut and bolt type, screws, or any other locking mechanism that provides the rotational movement of the eccentric bushings 38 at the time of fixing the support 24 on the toolbar 20.

Figure 3:
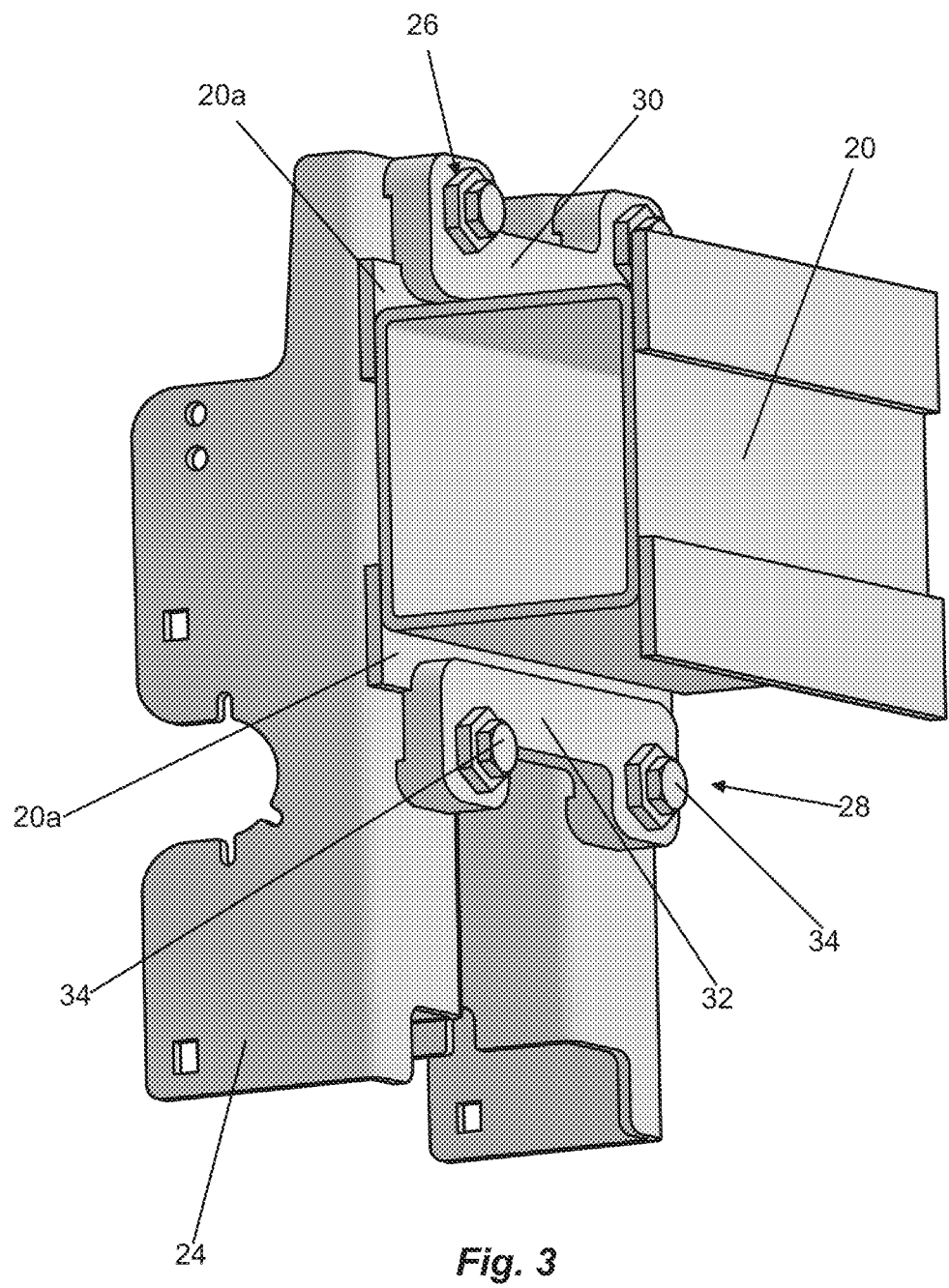
FIG. 3 shows a perspective view of a segment of the toolbar with the support mounted and secured through an adjustment system in accordance with an embodiment of the present invention.
Figure 6:
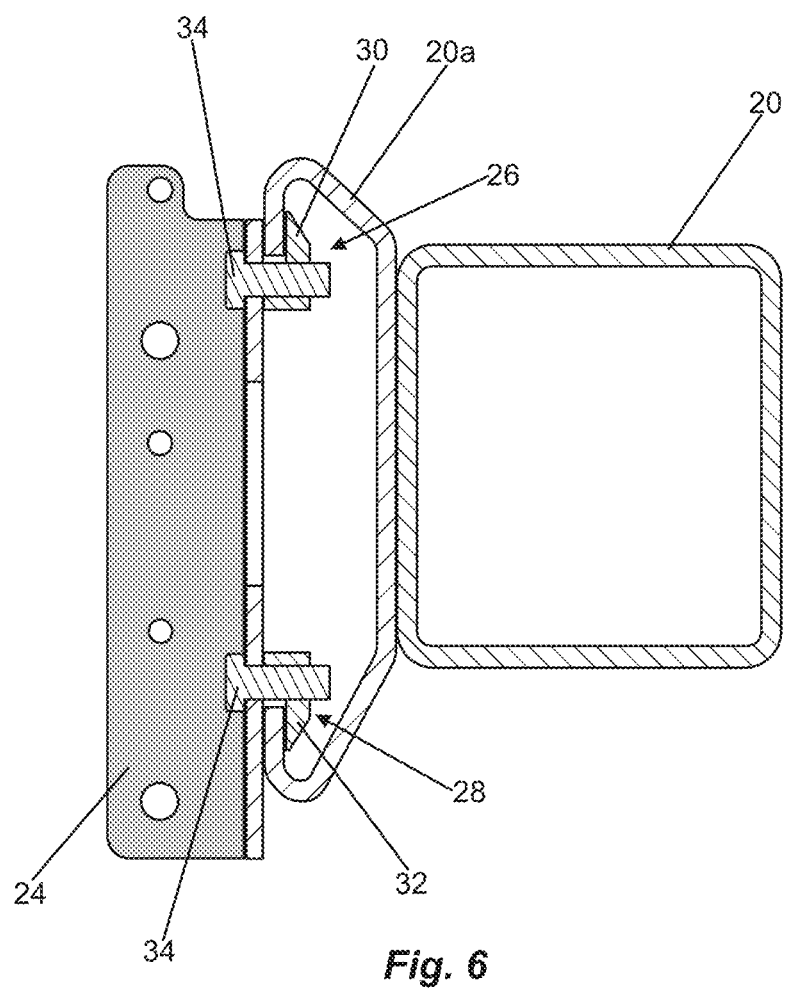
FIG. 6 shows a sectional side view of another model of toolbar with the support mounted and fixed through the adjustment system of the present invention.

The adjustment system, according to the present invention, can be applied to different models of toolbars 20, and more particularly to different types of mounting guides 20a. As shown in FIGS. 3 and 4, the toolbar 20 comprises linear mounting guides 20a, such as, for example, rulers which are welded to the body of the toolbar 20. FIG. 5 shows another model of toolbar 20, where the mounting guides 20 are formed in a "C" configuration and, in this case, said support blocks 30, 32 can be mounted internally to the "C" profile. Alternatively, according to yet another model of toolbar 20, not shown in the figures, it may comprise a mixed configuration, where one of the mounting assemblies 26, 28 is mounted on a closed profile as a model with the configuration in "C", and the other mounting assembly 26, 28 can be mounted on a linear profile, in both cases it is possible to apply the support blocks with the adjustment system of the present invention.

In this way, it is observed that the new proposal for the adjustment system for mounting and fixing supports 24 on toolbars 20 of agricultural implements 10, according to the present invention, manages to simply and efficiently eliminate possible gaps (h) from failures in the dimensioning of the parts and, therefore, guarantee the correct positioning of the planting row units 22, without risk of affecting the productivity of work operations and also the safety and integrity of agricultural equipment.

In addition to these direct benefits provided by the present invention, this adjustment system can be easily applied, even in agricultural implements currently in use, that is, it is a practical solution that can improve the working conditions of equipment that are already in field without the need for high investments by the farmer.

Additionally, as mentioned above, the present invention deals with an agricultural implement 10, which comprises a structural chassis 16 that is supported by at least one set of wheels 18 and also has toolbars 20 on which several planting row units 22 are installed through respective supports 24, each support 24 being mounted and fixed together with the toolbar 20 with an adjustment system as defined and presented above.

According to possible embodiments of the present invention, that agricultural implement 10 can be a planter, seeder, fertilizer spreader or a sprayer.

Finally, considering all of the above, it is important to note that the present description aims only to present and define, in an exemplary way, particular embodiments of the new adjustment system for mounting and fixing the supports 24 on toolbars 20 of agricultural implements 10, as defined by the present invention. Therefore, as a person skilled in the art should appreciate, several modifications and combinations of elements and equivalent details are possible without, therefore, deviating from the scope of protection defined by the attached claims.

The invention claimed is:

1. An adjustment system for mounting and fixing a support on a toolbar of an agricultural implement, comprising:
    at least one upper mounting assembly comprising an upper support block, wherein the upper support block is configured to couple to the support via first fasteners, and the upper support block is configured to engage an upper mounting guide of the toolbar;
    at least one lower mounting assembly comprising a lower support block, wherein the lower support block is configured to couple to the support via second fasteners, and the lower support block is configured to engage a lower mounting guide of the toolbar; and
    one or more eccentric bushings, wherein each eccentric bushing of the one or more eccentric bushings has a passing hole displaced from a center of the eccentric bushing;
    wherein at least one of the upper support block or the lower support block comprises at least one opening, and a respective eccentric bushing of the one or more eccentric bushings is disposed within each opening of the at least one opening.

2. The adjustment system according to claim 1, wherein the upper and lower support blocks are configured to move vertically.

3. The adjustment system according to claim 1, wherein the upper support block comprises the at least one opening, and the at least one opening of the upper support block comprises only one opening.

4. The adjustment system according to claim 1 wherein the upper support block comprises the at least one opening, and the at least one opening of the upper support block comprises two or more openings.

5. The adjustment system according to claim 1, wherein at least one fastener of the first fasteners, at least one fastener of the second fasteners, or a combination thereof, is of a screw type or a set of a screw and a nut.

6. The adjustment system according to claim 1, wherein at least one of the upper mounting guide or the lower mounting guide comprises a linear type mounting guide or a "C" type setting.

7. The adjustment system according to claim 1, wherein at least one of the one or more eccentric bushings has a smooth or threaded external surface.

8. The agricultural implement, comprising:
   a structural chassis supported by at least one assembly of wheels;
   the toolbar; and
   a planting row unit coupled to the toolbar via the support, wherein the support is mounted and fixed on the toolbar through the adjustment system as defined in claim 1.

9. The agricultural implement according to claim 8, wherein the agricultural implement is a planter, a seeder, a fertilizer spreader, or a sprayer.

10. The adjustment system according to claim 1, wherein the lower support block comprises the at least one opening, and the at least one opening of the lower support block comprises only one opening.

11. The adjustment system according to claim 1, wherein the lower support block comprises the at least one opening, and the at least one opening of the lower support block comprises two or more openings.

* * * * *